United States Patent [19]
Medsker et al.

[11] Patent Number: 6,150,464
[45] Date of Patent: Nov. 21, 2000

[54] PREFERRED PROCESS FOR SILICON HYDRIDE ADDITION AND PREFERRED DEGREE OF POLYMERIZATION FOR SILICON HYDRIDE FOR THERMOPLASTIC VULCANIZATES

[75] Inventors: Robert E. Medsker, Hartville; Jianqun Zhao, Cincinnati; Gary W. Gilbertson, Wadsworth; Kuo-Shein Shen; Donald Wang, both of Akron, all of Ohio

[73] Assignee: Advanced Elastomer Systems, L.P., Akron, Ohio

[21] Appl. No.: 09/201,263

[22] Filed: Nov. 30, 1998

Related U.S. Application Data

[63] Continuation-in-part of application No. 08/749,756, Nov. 1, 1996, Pat. No. 5,936,028, which is a continuation of application No. 08/566,380, Dec. 1, 1995, Pat. No. 5,672,660.

[51] Int. Cl.[7] .......................................... C08F 8/00
[52] U.S. Cl. .......................... 525/101; 525/100; 525/105; 525/106; 524/506; 524/862
[58] Field of Search ..................................... 525/101, 100, 525/105, 106; 524/506, 862

[56] References Cited

U.S. PATENT DOCUMENTS

| | | | |
|---|---|---|---|
| Re. 32,028 | 11/1985 | Fischer ..................................... | 525/194 |
| 2,671,774 | 3/1954 | McCracken et al. .................. | 260/80.7 |
| 2,823,218 | 2/1958 | Speier et al. ......................... | 260/448.2 |
| 3,037,954 | 6/1962 | Gessler et al. ......................... | 260/29.8 |
| 3,220,972 | 11/1965 | Lamoreaux ............................. | 260/46.5 |
| 3,249,580 | 5/1966 | Beck ....................................... | 260/37 |
| 3,584,080 | 6/1971 | Walker et al. .......................... | 260/889 |
| 4,046,930 | 9/1977 | Johnson et al. ......................... | 427/387 |
| 4,130,534 | 12/1978 | Coran et al. ..................... | 260/33.6 AQ |
| 4,130,535 | 12/1978 | Coran et al. ..................... | 260/33.6 AQ |
| 4,578,497 | 3/1986 | Onopchenko et al. ................. | 556/479 |
| 4,803,244 | 2/1989 | Umpleby ................................. | 525/105 |
| 4,831,081 | 5/1989 | King, III et al. ....................... | 525/105 |
| 4,916,180 | 4/1990 | Robinson et al. ...................... | 524/456 |
| 5,100,940 | 3/1992 | Wicher ...................................... | 524/94 |
| 5,100,947 | 3/1992 | Puydak et al. .......................... | 524/423 |
| 5,157,081 | 10/1992 | Puydak et al. .......................... | 525/237 |
| 5,240,983 | 8/1993 | Tabata et al. ........................... | 524/261 |
| 5,384,369 | 1/1995 | Brosins et al. .......................... | 524/193 |
| 5,416,147 | 5/1995 | Takarada et al. ....................... | 524/399 |
| 5,597,867 | 1/1997 | Tsujimoto et al. ....................... | 525/74 |
| 5,672,660 | 9/1997 | Medsker et al. ........................ | 525/101 |

FOREIGN PATENT DOCUMENTS

| | | |
|---|---|---|
| 0651009 | 5/1995 | European Pat. Off. . |
| 0855426 | 4/1997 | European Pat. Off. . |
| 6-212035 | 8/1994 | Japan . |
| 8-73682 | 3/1996 | Japan . |
| 1118327 | 7/1968 | United Kingdom . |

OTHER PUBLICATIONS

"Functionalized PMS/IB copolymers offer a wide range of properties", Hsien C. Wang and Kenneth W. Powers, *Elastomerics* Jan. 1 and Feb. 1, 1992

"Functionalized PMS/IB copolymers offer a wide range of properties—part II" by Hsien C. Wang and Keneth W. Powers, *Elastromeric*, Jan. 1 and Feb. 1, 1992.

*Primary Examiner*—Margaret G. Moore
*Attorney, Agent, or Firm*—Samuel P. Laferty; William A. Skinner

[57] ABSTRACT

An improved process for the preparation of thermoplastic elastomers by hydrosilylation crosslinking, in which a hydrosilylation crosslinking agent with a low degree of polymerization and/or a hydrosilylation crosslinking agent diluted in oil is used.

6 Claims, 1 Drawing Sheet

Figure 1

PREFERRED PROCESS FOR SILICON HYDRIDE ADDITION AND PREFERRED DEGREE OF POLYMERIZATION FOR SILICON HYDRIDE FOR THERMOPLASTIC VULCANIZATES

CROSS-REFERENCE TO RELATED APPLICATIONS

This is a continuation-in-part of U. S. patent application Ser. No. 08/749,756 filed Nov. 1, 1996 and now U.S. Pat. No. 5,936,028 which is a continuation-in-part of U.S. patent application Ser. No. 08/566,380 filed Dec. 1, 1995, now U.S. Pat. No. 5,672,.660. Both said prior references are hereby incorporated by reference.

FIELD OF THE INVENTION

This invention relates to thermoplastic elastomer compositions prepared using hydrosilylation crosslinking of the elastomer component of the composition. A thermoplastic elastomer is generally defined as a polymer or blend of polymers that can be processed and recycled in the same way as a conventional thermoplastic material, yet has properties and functional performance similar to that of vulcanized rubber at service temperatures High performance thermoplastic elastomers in which a highly vulcanized rubbery polymer is intimately dispersed in a thermoplastic matrix are generally known as thermoplastic vulcanizates.

BACKGROUND OF THE INVENTION

Polymer blends, which have a combination of both thermoplastic and elastic properties, are generally obtained by combining a thermoplastic resin with an elastomeric composition in a way such that the elastomer component is intimately and uniformly dispersed as a discrete particulate phase within a continuous phase of the thermoplastic. Early work with vulcanized rubber components is found in U.S. Pat. No. 3,037,954 which discloses both static vulcanization of the rubber, as well as the technique of dynamic vulcanization wherein a vulcanizable elastomer is dispersed into a molten resinous thermoplastic polymer and the elastomer is cured while continuously mixing and shearing the blend. The resulting composition is a micro-gel dispersion of cured elastomer in an uncured matrix of thermoplastic polymer.

In U.S. Pat. No. Re. 32,028 polymer blends comprising an olefin thermoplastic resin and an olefin copolymer are described, wherein the rubber is dynamically vulcanized to a state of partial cure. The resulting compositions are reprocessible. U.S. Pat. Nos. 4,130,534 and 4,130,535 further disclose thermoplastic vulcanizates comprising butyl rubber and polyolefin resin, and olefin rubber and polyolefin resin, respectively. The compositions are prepared by dynamic vulcanization and the rubber component is cured to the extent that it is essentially insoluble in conventional solvents. A range of crosslinking, or curing, agents for the vulcanization of the rubber are described in the early art, including peroxides, sulfurs, phenolic resins, radiation, and the like.

U.S. Pat. No. 4,803,244 generally discusses the use of multifunctional organosilicon compounds in conjunction with a catalyst as an agent for crosslinking the rubber component of a thermoplastic elastomer by hydrosilylation. Hydrosilylation involves the addition of a silicon hydride across a multiple bond, often with a transition metal catalyst. This patent describes a rhodium catalyzed hydrosilylation of EPDM rubber in a blend with polypropylene to produce thermoplastic elastomers having a gel content of up to 34% (after correction for the plastic phase). This degree of vulcanization was achieved only with a high level of catalyst.

A further modification of hydrosilylation crosslinking of the rubber in a thermoplastic elastomer composition is disclosed in European Patent Applications Nos. 0776,937-A2 and 651,009. A compatibilizing agent, containing in the same molecule a component having an affinity for the rubber and a component having an affinity for the thermoplastic resin, is incorporated into the composition and is said to improve adhesion between the rubber and resin in order to prevent agglomeration.

SUMMARY OF THE INVENTION

The present invention is based on the discovery that the process for hydrosilylation crosslinking of the rubber in a thermoplastic vulcanizate (TPV) can be improved by either employing a hydrosilylation crosslinking agent of low degree of polymerization (i.e. up to 30) or diluting the hydrosilylation crosslinking agent in oil before adding it to the TPV or combinations thereof. This combination provides rapid crosslinking of the elastomer to a fully vulcanized state, yet requires an unexpectedly low concentration of the hydrosilylation crosslinking agent and catalyst in order to achieve the cure. In the instant invention no compatibilizer is required in order to produce compositions with excellent mechanical properties.

In a further embodiment of the invention, additives, which react with residual silicon hydride functionality in the thermoplastic elastomer, are incorporated into the process. This results in a composition which has further improved long term heat aging characteristics.

The compositions produced by the improved process have utility as replacements for thermoset rubber compounds in a variety of applications, particularly where molding or extrusion is involved and the combination of thermoplastic and elastomeric properties provides an advantage. Typical uses include molded articles for automobile underhood parts, engineering and construction materials, mechanical rubber goods, industrial parts such as hose, tubing and gaskets, electrical applications and household goods.

DESCRIPTION OF THE PREFERRED EMBODIMENTS

Thermoplastic elastomer compositions may generally be prepared by blending a thermoplastic resin and a rubber, then melting the thermoplastic component and mixing the melt until the blend is homogeneous. If a composition of vulcanized rubber in a thermoplastic matrix is desired, crosslinking agents (also referred to as curatives or vulcanizing agents) are added to the blend and crosslinking occurs during the mixing. This latter process is described as dynamic vulcanization.

A wide range of thermoplastic resins and rubbers and/or their mixtures have been used in the preparation of thermoplastic elastomers, including polypropylene, HDPE, LDPE, VLDPE, LLDPE, cyclic olefin homopolymers or copolymers as well as olefinic block copolymers, polystyrene, polyphenylene sulfide, polyphenylene oxide and ethylene propylene copolymer (EP) as the thermoplastics, with ethylene propylene diene rubber (EPDM), acrylonitrile butadiene rubber (NBR), various isobutylene copolymers and/or natural rubber (NR) as the elastomer. When the elastomer component is crosslinked, agents such as sulfur, peroxide, phenolics and ionic compounds are often used.

Hydrosilylation Agents

Hydrosilylation has also been disclosed as a crosslinking method. In this method a silicon hydride having at least two SiH groups in the molecule is reacted with the carbon-carbon multiple bonds of an unsaturated (i.e. containing at least two carbon-carbon double bonds) rubber component of the thermoplastic elastomer, in the presence of the thermoplastic resin and a hydrosilylation catalyst. Silicon hydride compounds useful in the process of the invention include methylhydrogen polysiloxanes, methylhydrogen dimethylsiloxane copolymers, alkyl methyl polysiloxanes, bis(dimethylsilyl)alkanes and bis(dimethylsilyl)benzene.

Preferred silicon hydride compounds may be described by the formula

Formula (1)

where each R is independently selected from the group consisting of alkyls comprising 1 to 20 carbon atoms, cycloalkyls comprising 4 to 12 carbon atoms and aryls. In formula (1) it is preferred that each R be independently selected from a group consisting of alkyls comprising 1 to 12 carbon atoms. Even more preferred is R=methyl; R' represents a hydrogen atom, an alkyl or alkoxy group having from 1 to about 24 carbon atoms; and R" represents R or a hydrogen atom.

D represents the group

D' represents the group

T represents the group m is an integer having a value ranging from 1 to 50, n is an integer having a value ranging from 1 to 50, and p is an integer having a value ranging from 0 to 6. For the purpose of this application the sum of m, n and p will be defined as the degree of polymerization.

Preferred degrees of polymerization are up to 30, more preferably from about 2 to about 20 or 30 and most preferably from about 2 or 3 to about 10 or 15 wherein each molecule on average contains at least 2 Si—H bonds.

Particularly preferred polyorganosiloxanes are those in which the silicon atom of the silicon hydride functionality is bound by heteroatoms/atoms having lone pairs of electrons. The preferred polyorganosiloxanes may also be substituted with appropriate functionality permitting solubility in the reaction media. A type of this functionalization is described in U.S. Pat. No. 4,046,930 which teaches alkylation of polyorganosiloxanes. Weight percent of alkylation should not exceed a level that may retard or prevent the crosslinking reaction rates due to steric constraints.

It has been discovered that higher gel content in the rubber phase and better physical properties, such as low compression and tension set and low oil swell, can be achieved by diluting the hydrosilylation crosslinking agent in an inert mobile component such as oil prior to addition of it to the components of the thermoplastic vulcanizate. The oil is believed to increase the mobility and diffusion rate of the crosslinking agent in the rubber portion of the thermoplastic vulcanizate. Desirably, the hydrosilylation crosslinking agent is prediluted in oil so that it is from 20 to about 80 weight percent active, more desirably from about 25 to about 75, preferably from about 40 to about 60, and more preferably from about 45 to about 55 weight percent active crosslinking agent with the remainder being substantially oil. As previously set forth, the oil increases the mobility of the hydrosilation crosslinking agent (silicon hydride) in the rubber(s) so that it is better dispersed and more effective in generating crosslinks.

It has also been discovered that lower molecular weight hydrosilylation crosslinking agents are more efficiently dispersed in the components of the TPV and their use results in higher gel content and/or more efficient crosslinking of the rubber component. A popular hydrosilylation crosslinking agent has been Dow Corning's DC 2-2822 product having, structure where m+n is defined as the degree of polymerization and equals about 42 on average and about 30 mole percent of the m+n units are n units. The repeat units with an n subscript can be created by alkylating a repeat unit with a subscript m. The n units make the crosslinking agent more soluble in hydrocarbon rubbers. It has been discovered that silicone hydride crosslinkers having a DP of 6 or 8 are more effective than higher DP silicone hydride crosslinkers at equivalent Si—H concentrations. Desirably, the degree of polymerization of the crosslinking agent is up to 30, more desirably from about 2 to about 20 or 30, and preferably from about 2 or 3 to about 10 or 15.

The amount of silicon hydride compound useful in the process of the present invention can generally range from about 0.1 to about 10.0 mole equivalents of SiH per carbon-carbon double bond in the rubber, and preferably is in the range of about 0.5 to about 5.0 mole equivalents of SiH per carbon-carbon double bond in the rubber component of the thermoplastic elastomer.

Thermoplastic Resins

Thermoplastic resins useful in the compositions produced by the invention include crystalline polyolefin homopolymers and copolymers. They are desirably prepared from monoolefin monomers having 2 to 20 carbon atoms, such as ethylene, propylene, 1-butene, 1-pentene and the like, as well as copolymers derived from linear and cyclic olefins, with propylene being preferred. As used in the specification and claims the term polypropylene includes homopolymers and copolymers of propylene as well as reactor copolymers of polypropylene which can contain about 1 to about 20 wt % of ethylene or an -olefin comonomer of 4 to 20 carbon atoms, and mixtures thereof. The polypropylene can be crystalline, isotactic or syndiotactic polypropylene. Commercially available polyolefins may be used in the practice of the invention. Other thermoplastic resins which are substantially inert to the rubber, the silicon hydride and the hydrosilylation catalyst would also be suitable. Blends of thermoplastic resins may also be used.

The amount of thermoplastic resin found to provide useful compositions is generally from about 5 to about 90 weight percent, based on the weight of the rubber and resin (total polymer). Preferably, the thermoplastic resin content will range from about 20 to about 80 percent by weight of the total polymer.

Rubbers

Unsaturated rubbers useful to prepare thermoplastic elastomers according to the invention include monoolefin copolymer rubbers comprising non-polar, rubbery copolymers of two or more monoolefins (EPR rubber), preferably copolymerized with at least one polyene, usually a diene (EPDM rubber). EPDM is a polymer of ethylene, propylene and one or more non-conjugated diene(s), and the monomer components may be polymerized using Ziegler-Natta or metallocene catalyzed reactions, among others. Typically an EPDM rubber has from about 0.5 to about 6 or 10 weight percent of a diene (based on the weight of the polymer) and has a molar ratio of repeat units from ethylene to propylene of from 25:75 to 75:25. Satisfactory non-conjugated dienes include 5-ethylidene-2-norbornene (ENB); 1,4-hexadiene (HD); 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); 5-vinyl-2-norbornene (VNB) and the like, or a combination thereof.

In one embodiment of the invention, it has been found that rubber having a structure in which the diene monomer has carbon-carbon multiple bonds which are predominantly unencumbered, i.e. bonds which are sterically unhindered such as terminal or pendant double bonds, provide a greatly improved rate of cure in the hydrosilylation curing process of the invention. Included in this embodiment are structures in which the bonds either normally are unencumbered or are easily isomerized to form a sterically unencumbered double bond, which is then rapidly hydrosilylated, e.g. structures from 1,4-hexadiene or ENB. This improvement is particularly significant where a fully cured rubber component is desired. The use of rubber in which the diene component is selected from the group consisting of 5-ethylidene-2-norbornene, 5-methyl-1,4-hexadiene, 1,4-hexadiene and 5-vinyl-2-norbornene is preferred. A structure from 5-vinyl-2-norbornene is particularly preferred as a diene component of such rubber.

Butyl rubbers are also useful in the compositions of the invention. As used in the specification and claims, the term "butyl rubber" includes copolymers of an isoolefin and a conjugated monoolefin, terpolymers of an isoolefin, a conjugated monoolefin and divinyl aromatic monomers, and the halogenated derivatives of such copolymers and terpolymers. The useful butyl rubber copolymers comprise a major portion of isoolefin and a minor amount, usually less than 30 wt %, of a conjugated multiolefin. The preferred copolymers comprise about 85–99.5 wt % of a $C_{4-7}$ isoolefin such as isobutylene and about 15–0.5 wt % of a multiolefin of 4–14 carbon atoms, such as isoprene, butadiene, dimethyl butadiene, 4-methyl-1,4-pentadiene and piperylene. Commercial butyl rubber, useful in the invention, is a copolymer of isobutylene and minor amounts of isoprene. Other butyl co- and terpolymer rubbers are illustrated by the description in U.S. Pat. No. 4,916,180. Isobutylene/divinylbenzene is particularly preferred as an elastomer suitable for hydrosilylation crosslinking, as are the halogenated derivatives of butyl rubber such as chlorobutyl and bromobutyl.

Copolymer and terpolymers including isobutylene (an isoolefin) and aromatic divinyl monomers are particularly preferred as an elastomer suitable for hydrosilylation crosslinking due to the greater reactivity towards crosslinking of the residual carbon to carbon double bonds from aromatic divinyl monomers.

A highly preferred subset of butyl rubbers are those having carbon to carbon double bonds with greater reactivity towards crosslinking reactions than is typically achieved with residual double bonds derived from conjugated dienes. Examples of these double bonds are the residual double bond in aromatic divinyl compounds such as divinylbenzene monomers after copolymerization with isobutylene.

The copolymer of at least an isoolefin and an aromatic divinyl monomer desirably comprises from about 80 to about 99.8 weight percent repeating units from an isoolefin (e.g. isomonoolefin) of 4 to 7 carbon atoms, from about 0 to about 19.8 weight percent repeating units from an aliphatic polyene (e.g. diene) of 4 to 14 carbon atoms and from about 0.2 to about 5 weight percent repeating units from an aromatic divinyl compound other than said aliphatic polyene of the formula Formula II where the symbol X represents an aromatic nucleus and the symbols R which may be the same or different represent hydrogen atoms or alkyl groups of 1 to 5 carbon atoms. X, the aromatic nucleus, can be any aromatic group including those represented by the benzene ring, the naphthalene rings, pyridine ring, and mono or poly alkyl substituted versions thereof. The preferred isoolefin is isobutylene, the preferred polyene is isoprene, and the preferred aromatic divinyl compound is divinylbenzene. U.S. Pat. No. 3,584,080 is incorporated by reference for a more detailed description of the copolymer. Preferably the repeating units from the polyene is from about 0.1 to about 5 weight percent of the copolymer. Preferably the repeating units from aromatic divinyl compound is from about 0.2 to 4 weight percent (2000 to 40,000 ppm) and more preferably from about 0.5 to about 3 weight percent (5000 to 30,000 ppm) of the copolymer. It is noted that a large portion of the unsaturated repeat units from the aromatic divinyl compound are consumed in reactions during polymerization and are not available as unsaturated units (e.g. they are converted to saturated units) for hydrosilation crosslinking.

A preferred butyl rubber thus comprises a copolymer of at least an isoolefin and an aromatic divinyl compound. The repeat units therein with residual unsaturation from an aromatic divinyl compound are desirably present from about 50 to about 5000 ppm (0.005 to about 0.5 wt % based on the total amount of butyl rubber) and more desirably from about 200 to about 2500 ppm. The repeat units from an isoolefin desirably are from about 85 to 99.5 wt % and repeat units from a multiolefin (polyene) of 4–14 carbon atoms can be absent or present in an amount from about 0.5 to about 15 wt % based on the total amount of repeat units in the butyl rubber copolymer. A percentage of the repeat units from divinylbenzene may be present as repeat units without residual unsaturation. As the repeat units from aromatic divinyl compounds (e.g. divinylbenzene) are very reactive to crosslinking, it is sometimes desirable to dilute the copolymers of isobutylene and aromatic divinyl compounds with more conventional butyl rubbers described in the previous paragraph. A commercial example of a copolymer of isobutylene and divinylbenzene is Polysar Butyl XL 10000 available from Bayer Corporation. Said Polysar Butyl XL 10000 has a Mooney viscosity 1+8@125° C. of 60–75 and about 20–30 wt % of the polymer is soluble in cyclohexane. XL 10000 starts with about 2000 ppm unsaturated repeat units from divinylbenzene. Butyl rubbers are also available from Bayer as XL 68102 having about 1500 ppm unsaturated repeat units from divinylbenzene and Mooney viscosity of 59–75 and as XL 30102 having about 600 ppm unsaturated repeat units from divinylbenzene and a Mooney viscosity from about 67–83. The products with designations XL 68102 and XL 30102 are believed to be blends of two different butyl rubbers, one with repeat units from divinylbenzene and one without such repeat units (e.g. a butyl rubber of isobutylene and a conjugated diene).

An unsaturated repeat unit from an aromatic divinyl compound will desirably have the structure:

Formula III

Where X and R are as previously defined.

A close examination of this repeat units reveals that the carbon to carbon double bond has little steric hindrance and mobility with respect to the polymer backbone which may facilitate its reaction with hydrosilation crosslinking agents.

Another preferred rubber is an acrylic or alkacrylic group functionalized (modified by adding the functional group) copolymer of at least isobutylene and paramethylstyrene. By the term acrylic or alkacrylic group, applicant means acrylic or alkacrylic or combinations thereof. The term alkacrylic is intended to express that the acrylic can have an alkyl or alkenyl substituent thereon of 1 to 5 carbon atoms, preferably methyl or ethyl. The functionalization reaction involves halogenating the copolymer of isobutylene and paramethyl styrene as set forth in EP publication no. 0 344 021 (preferably by bromination) and then reacting the brominated polymer with $R_2R_3C=CR_1COO^-M^+$ such as illustrated below.

where $R_1$ and $R_2$ are H or an alkyl of 1 to 5 carbon atoms and $R_3$ is H, an alkyl or an alkenyl of 1 to 5 carbon atoms and $M^+$ is a counterion such as $H^+$, $Na^+$, $K^+$, etc. The amount of acrylic or alkacrylic groups per polymer chain can vary depending on the properties desired. Desirably, the number of moles of acrylic or alkacrylic or combinations thereof, if both are present, is from about 0.1 to about 5 mole %, more desirably from about 0.3 to about 1.5 mole % based on the total moles of repeat units.

Desirably, the copolymer of isobutylene and paramethylstyrene comprises repeat units from at least isobutylene and paramethylstyrene. Other copolymerizable monomers can be present in small amounts. The amount of repeating units from isobutylene is desirably from about 80 to about 99 weight percent, more desirably from about 89 to about 98 weight percent and the amount of repeat units from paramethylstyrene is from about 1 to about 20 weight percent and more desirably from about 2 to about 11 weight percent.

While a preferred embodiment is using the acrylic or alkacrylic group, or combinations thereof, functionalized copolymer of isobutylene and paramethylstyrene as the entire rubber component, it is possible to use a blend of said copolymer with the rubbers described herein. Desirably in a blend of the copolymer with other rubbers the copolymer is a majority by weight of the total rubbers in the thermoplastic vulcanizate.

A further rubber suitable in the invention is natural rubber. The main constituent of natural rubber is the linear polymer cis-1,4-polyisoprene. It is normally commercially available in the form of smoked sheets and crepe. Synthetic polyisoprene can also be used, with the particularly preferred synthetic polyisoprene elastomers being those that contain vinyl functionality pendant to the main polymer chain, i.e. 1,2-enchainments.

Polybutadiene is also a suitable elastomer for hydrosilylation curing with polybutadienes that contain vinyl functionality being the most preferred.

Blends of any of the above rubbers may also be employed, rather than a single olefinic rubber.

In preparing the compositions of the invention, the amount of rubber generally ranges from about 95 to about 10 weight percent based on the weight of the rubber and thermoplastic resin (total polymer). Preferably, the rubber content will be in the range of from about 80 to about 20 weight percent of total polymer.

Hydrosilylation Catalysts

It has previously been understood that any catalyst, or catalyst precursor capable of generating a catalyst in situ, which will catalyze the hydrosilylation reaction with the carbon-carbon bonds of the rubber can be used. Such catalysts have included transition metals of Group VIII such as palladium, rhodium, platinum and the like, including complexes of these metals. Chloroplatinic acid has been disclosed as a useful catalyst in U.S. Pat. No. 4,803,244 and European Application No. 651,009, which further disclose that the catalyst may be used at concentrations of 5 to 10,000 parts per million by weight and 100 to 200,000 parts per million by weight based on the weight of rubber, respectively.

It has been found in the process of the present invention that significantly lower concentrations of platinum-containing catalyst can be used, while obtaining improvement in both the speeds of the reaction and the efficiency of the crosslinking. Concentrations of catalyst in the range of about 0.01 or 0.1 to about 10, 20 or 40 parts per million by weight of rubber, expressed as platinum metal are effective in rapidly and completely curing the rubber in the process of dynamically vulcanizing blends of thermoplastic resin and rubber. These low catalyst concentrations are particularly effective in combination with a diene-containing rubber having carbon-carbon multiple bonds which are predominantly sterically unhindered. Catalyst concentrations of about 0.1 to about 4 or 25 parts per million by weight based on the weight of rubber, expressed as platinum metal, are particularly preferred.

Platinum-containing catalysts, which are useful in the process of the invention, are described, for example, in U.S. Pat. No. 4,578,497; U.S. Pat. No. 3,220,972; and U.S. Pat. No. 2,823,218 all of which are incorporated herein by this reference. These catalysts include chloroplatinic acid, chloroplatinic acid hexahydrate, complexes of chloroplatinic acid with sym-divinyltetramethyldisiloxane, dichloro-bis (triphenylphosphine) platinum (II), cis-dichloro-bis (acetonitrile) platinum (II), dicarbonyldichloroplatinum (II), platinum chloride and platinum oxide. Zero valent platinum metal complexes such as Karstedt's catalyst are particularly preferred, as described in U.S. Pat. No. 3,775,452; U.S. Pat. No. 3,814,730; and U.S. Pat. No. 4,288,345 all of which are incorporated herein by reference.

In order for the catalyst to function most efficiently in the dynamic vulcanization environment, it is important that it is inherently thermally stable, or that its activity is inhibited to prevent too rapid a reaction or catalyst decomposition. Appropriate catalyst inhibitors that are suitable to stabilize the platinum catalyst at high temperatures include 1,3,5,7-tetravinyl-1,3,5,7-tetramethylcyclotetrasiloxane and its higher analogs such as vinyl cyclic pentamer.

However, other olefins that are stable above 165° C. are also useful. These include maleates, fumarates and the cyclic pentamer. It is also particularly preferred in the invention to use a catalyst that remains soluble in the reaction medium.

Additives

The thermoplastic elastomer may contain conventional additives, which can be introduced into the composition in the thermoplastic resin, the rubber, or in the blend either before, during or after the hydrosilylation and curing. Examples of such additives are antioxidants, processing aids, reinforcing and nonreinforcing fillers, pigments, waxes, rubber processing oil, extender oils, antiblocking agents, antistatic agents, ultraviolet stabilizers, plasticizers (including esters), foaming agents, flame retardants and other processing aids known to the rubber compounding art. Such additives may comprise from about 0.1 to about 300 percent by weight based on the weight of the rubber and thermoplastic in the final thermoplastic elastomer product. Fillers and extenders, which can be utilized, include conventional inorganics such as calcium carbonate, clays, silica, talc, titanium dioxide, carbon black and the like. Additives, fillers or other compounds, which may interfere with the hydrosilylation, should be added after curing reaches the desired level.

Extender Oil

The rubber processing or extender oils used in thermoplastic elastomers generally are paraffinic, naphthenic or aromatic oils derived from petroleum fractions. The type will be that ordinarily used in conjunction with the specific rubber or rubbers present in the composition, and the quantity may range from zero to several hundred parts per hundred parts by weight rubber. Important to the efficiency of the catalyst is that the oils and other additives contain no or very low concentrations of compounds that are catalyst inhibitors or that interfere with the activity of the catalyst. These compounds include phosphines, amines, sulfides, thiols or other compounds that may be classified as Lewis bases. Lewis bases, or other compounds that have a pair of electrons available for donation, will react with the platinum catalyst, effectively neutralizing its activity. It has been discovered that the presence of such compounds has a surprisingly detrimental impact on hydrosilylation curing in the process of dynamic vulcanization of the rubber component of the thermoplastic elastomer compositions. If the concentration of compounds which have the chemical reactivity of Lewis bases, such as compounds containing sulfur or nitrogen, is maintained at or below a level which provides less than about 1000 ppm and 300 ppm of sulfur and nitrogen respectively, then the amount of platinum catalyst required to promote efficient hydrosilylation curing in dynamic vulcanization can be substantially reduced, usually to the range of about 4 ppm or less, without impact on the cure state of the rubber or the tensile properties of the thermoplastic elastomer product. Concentrations of sulfur and nitrogen below about 500 and 200 ppm respectively are more preferred, and concentrations of less than about 30 ppm sulfur and less than about 100 ppm nitrogen are most preferred. It has been discovered that, even at catalyst concentrations as low as 0.25 ppm, full cure of the elastomer can be achieved if the concentration of sulfur and nitrogen is within the most preferred ranges.

Most paraffinic petroleum oils for the rubber industry are derived from a crude oil distillation stream. A typical refining history would include some type of dewaxing to reduce the pour point, a solvent extraction to physically remove aromatic compounds and a hydrotreating process to chemically modify aromatic structures. Both extraction and hydrotreating result in a net increase in the total concentration of saturated hydrocarbon structures and a net decrease in the total aromatic, sulfur and nitrogen-containing compound concentration. The degree of reduction in concentration of these compounds in the oil is dependent upon the type and severity of the refining employed, and the nature of the crude oil. White and paraffinic oils have been treated more extensively than aromatic and napthenic oils and would contain a smaller concentration of aromatic, sulfur and/or nitrogen compounds. It is difficult to elucidate the exact chemical structure of these compounds due to their complexity. The tendency of an oil to interfere with platinum catalyzed hydrosilylation is directly related to the concentration of sulfur and nitrogen containing compounds, as well as compounds which contain phosphorus, tin, arsenic, aluminum and iron.

Processing

The rubber component of the thermoplastic elastomer is generally present as small, i.e. micro-size, particles within a continuous thermoplastic resin matrix, although a co-continuous morphology or a phase inversion is also possible depending upon the amount of rubber relative to plastic and the degree of cure of the rubber. The rubber is desirably at least partially crosslinked, and preferably is completely or fully crosslinked. It is preferred that the rubber be crosslinked by the process of dynamic vulcanization. As used in the specification and claims, the term "dynamic vulcanization" means a vulcanization or curing process for a rubber blended with a thermoplastic resin, wherein the rubber is vulcanized under conditions of shear at a temperature at which the mixture will flow. The rubber is thus simultaneously crosslinked and dispersed as fine particles within the thermoplastic resin matrix, although as noted above other morphologies may exist. Dynamic vulcanization is effected by mixing the thermoplastic elastomer components at elevated temperatures in conventional mixing equipment such as roll mills, Banbury mixers, Brabender mixers, continuous mixers, mixing extruders and the like. The unique characteristic of dynamically cured compositions is that, notwithstanding the fact that the rubber component is partially or fully cured, the compositions can be processed and reprocessed by conventional plastic processing techniques such as extrusion, injection molding and compression molding. Scrap or flashing can be salvaged and reprocessed.

The terms "fully vulcanized" and "fully cured" or "fully crosslinked" as used in the specification and claims means that the rubber component to be vulcanized has been cured or crosslinked to a state in which the elastomeric properties of the crosslinked rubber are similar to those of the rubber in its conventional vulcanized state, apart from the thermoplastic elastomer composition. The degree of cure can be described in terms of gel content, or conversely, extractable components. Gel content reported as percent gel (based on the weight of crosslinkable rubber) is determined by a procedure which comprises determining the amount of insoluble polymer by soaking the specimen for 48 hours in organic solvent at room temperature, weighing the dried residue and making suitable corrections based upon knowledge of the composition. Thus, corrected initial and final weights are obtained by subtracting from the initial weight the weight of soluble components, other than rubber to be vulcanized, such as extender oils, plasticizers and components of the composition soluble in organic solvent, as well as that rubber component of the product which is not intended to be cured. Any insoluble polyolefins, pigments, fillers, and the like are subtracted from both the initial and final weights. The rubber component can be described as fully cured when less than about 5%, and preferably less than 3%, of the rubber which is capable of being cured by hydrosilylation is extractable from the thermoplastic elastomer product by a solvent for that rubber. Alternatively the degree of cure may be expressed in terms of crosslink density. All of these descriptions are well known in the art, for example in U.S. Pat. Nos. 4,593,062, 5,100,947 and 5,157,081, all of which are fully incorporated herein by this reference.

The following general procedure was used in the preparation of thermoplastic elastomers (vulcanizates) by the process of the invention, as set forth in the examples. The thermoplastic resin and oil extended rubber were placed in a heated internal mixer with the hydrosilylation agent and hydrosilylation catalyst. The hydrosilylation agent and catalyst can be incorporated into the composition by any suitable technique, for example by injection as solutions in oil or as neat components, although a dilute hydrosilylation solution in oil and a dilute catalyst solution are preferred. Additives such as antioxidants, ultraviolet stabilizers and fillers may also be added as a slurry in oil. Masterbatches of the components may also be prepared to facilitate the blending process. The mixture was heated to a temperature sufficient to melt the thermoplastic component, and the mixture was masticated, with added processing oil if desired, until a maximum of mixing torque indicated that vulcanization had occurred. Mixing was continued until the desired degree of vulcanization was achieved.

The order of addition of the hydrosilylation agent and hydrosilylation catalyst was found to be important. Maximum catalyst efficiency was obtained when the hydrosilylation agent was added first to the blend, followed by the hydrosilylation catalyst. The mechanical properties of the thermoplastic elastomer products, as well as the degree of cure, were improved when this order of addition was followed.

The invention will be better understood by reference to the following examples, which serve to illustrate but not limit the present process. In the examples, the following test methods were used to determine the properties of the thermoplastic elastomer products.

| Hardness (Shore A/D) | ASTM D 2240 |
| Ultimate tensile strength (UTS - psi) | ASTM D 412 |
| Ultimate elongation (UE - %) | ASTM D 412 |
| Modulus at 100/300% elongation | |
| (M1 or M3 - psi) | ASTM D 412 |
| Tension set (TS - %) | ASTM D 412 |
| Oil swell (OS - %) | ASTM D 471 |
| Heat aging | ASTM D 573 |

The rubber component used in the compositions prepared according to the examples is further identified as follows.

| | |
|---|---|
| Rubber "A" | EPDM - 2.1% ENB; 52% ethylene |
| Rubber "B" | EPDM - 5% HD; 55% ethylene |
| Rubber "F" | EPDM - 3% VNB; 55% ethylene |
| Rubber "G" | EPDM - 5.5% ENB; 60% ethylene |
| Rubber "K" | EPDM - 1.1% VNB; 64% ethylene |
| Rubber "L" | EPDM - 0.7% VNB; 62.6% ethylene |
| Rubber M | Butyl XL 10,000 from Polysar |
| Rubber N | Butyl XL 30,102 from Polysar |
| Polypropylene A | Polypropylene MFI = 0.7 |
| Polypropylene B | Homopolypropylene MFI = 20 |
| Extender Oil A | Sunpar 150M from Sun Chemical 585 ppm sulfur, 164 ppm nitrogen |
| Extender Oil B | Sunpar LW 150M from Sun Chemical 19 ppm, sulfur, 103 ppm nitrogen |
| Extender Oil C | White Oil D-200 from Lyondell 1.0 ppm sulfur, 1.0 ppm nitrogen |

EXAMPLE 1

Compositions were prepared by the method of the invention as generally described above, using polypropylene resin and EPDM rubber containing various diene components. The plastic and rubber components were melt mixed in a Brabender mixer at 180 C. until the polypropylene was melted. Silicone hydride (alkylated methyl hydrogen polysiloxane) was added dropwise to the melt mix, followed by addition of an oil solution containing platinum [platinate (II) hexachloro, dihydrogen reaction product with 2,4,6,8-tetraethenyl-2,4,6,8-tetramethyl cyclotetrasiloxane]. The rubber was dynamically vulcanized by mixing the blend until the maximum torque was reached. The product was removed from the mixer, then returned to the mixer and masticated at 180 C. for an additional minute. Plaques were prepared by compression molding the products of the dynamic vulcanization at 200 C. to a thickness of 60 mil and cooling under pressure, and the physical properties were determined using these plaques. All of the products were elastomeric, as defined by ASTM D1566, i.e. all had tension set values of less than 50%. The compositions and their properties are set forth in Table I.

Example 1 of U.S. Pat. No. 4,803,244 is set forth in comparison to several EPDM rubbers crosslinked with a platinum catalyst. In this comparative example, (Example 1 of U.S. Pat. No. 4,803,244) similar resin and rubber components were dynamically vulcanized by hydrosilylation, but the equivalent of 35 ppm of rhodium metal was used as the catalyst

TABLE I

| COMPOSITION | I | Patent Ex. 1 of U.S. 4,803,244 | II | III | IV |
|---|---|---|---|---|---|
| Polypropylene A (parts) | 67 | 50 | 67 | 41 | 41 |
| EPDM Rubber "A" (parts) | 100 | 100 | — | — | — |
| EPDM Rubber "B" (parts) | — | — | 100 | — | — |
| EPDM Rubber "F" (parts) | — | — | — | 100 | — |
| EPDM Rubber "G" (parts) | — | — | — | — | 100 |
| Si—H A (phr) | 2.5 | 6.7 | 3 | 2.2 | 3 |

TABLE I-continued

| COMPOSITION | I | Patent Ex. 1 of U.S. 4,803,244 | II | III | IV |
|---|---|---|---|---|---|
| Rhodium (ppm) | — | 35 | — | — | — |
| Platinum (ppm) | 15 | — | 7.6 | 4 | 13 |
| Physical Properties | | | | | |
| Hardness (A/D) | 93/40 | 88/26 | 39 D | 69 A | 63 A |
| UTS (psi) | 2500 | 769 | 2210 | 1080 | 905 |
| UE (%) | 405 | 240 | 330 | 211 | 406 |
| M1 | 1750 | 305 | 1510 | 636 | 408 |
| TS (%) | 22 | 43 | 24 | — | — |
| Gel (%) (corrected for plasfic phase) | 95 | 15 | 92 | 99 | 90 |

The compositions III and IV also contained 130 phr paraffin oil, 42 phr clay, 5 phr wax, 2 phr ZnO It can be seen that the use of much lower levels of platinum catalyst in the hydrosilylation crosslinking of Rubbers A, B, F and G (EPDM rubbers containing 2.1% ENB, 5% HD, 3% VNB, and 5.5% ENB) results in a marked increase in the level of crosslinking (as reflected by gel content) and improved tensile properties in the thermoplastic elastomer, as compared to the use of rhodium as the catalyst.

EXAMPLE 2

In order to study the effect of extender oil, compositions were prepared as generally described above using polypropylene resin and EPDM rubber. Masterbatches of rubber were prepared containing three different extender oils with progressively lower aromatic fractions and lower sulfur and nitrogen concentrations. The masterbatch composition was 100 parts rubber, 100 parts extender oil, 42 parts clay, 2 parts zinc oxide and 5 parts wax. The polypropylene (41 parts) was added to this masterbatch of rubber "K" and mixed in a Brabender mixer at 180 C. until the polypropylene was melted. Silicone hydride (3 phr) was added dropwise to the mix, followed by addition of an oil solution containing platinum catalyst at various levels. The rubber was dynamically vulcanized by mixing the blend until maximum torque was reached. Additional processing oil (30 parts) was added after the cure. The product was removed from the mixer, then returned to the mixer and masticated at 180 C. for an additional minute. Test specimens were prepared by compression molding the products at 200 C., and the oil swell properties were determined by the test method of ASTM D471, using IRM 903 oil at 125 C. for 24 hours. The results, expressed as percent swell (or weight gain) of the specimen, are set forth in Table II.

TABLE II

| Pt Catalyst | Extender Oil A | | | Extender Oil B | | | Extender Oil C | | |
|---|---|---|---|---|---|---|---|---|---|
| | OS | S:Pt | N:Pt | OS | S:Pt | N:Pt | OS | S:Pt | N:Pt |
| 0.25 ppm | 339 | 14300 | 8942 | — | — | — | 119 | 24 | 55 |
| 0.5 | 285 | 7150 | 4471 | 105* | 227 | 2808 | 92.3 | 12 | 23 |
| 1.0 | 222 | 3575 | 2236 | 86.4 | 114 | 1404 | 85.3 | 6 | 12 |
| 1.9 | 140 | 1882 | 1177 | 85.8 | 60 | 739 | 85.6 | 3.2 | 6 |
| 2.4 | 98 | 1490 | 932 | 93.4 | 48 | 585 | — | — | — |

*Average of two tests

The relative degree of swelling in oil is representative of the crosslink density of the vulcanized rubber, i.e. higher crosslink density in the rubber results in lower oil swell values. The data in Table II clearly shows that materials prepared using extender oil which has low amounts of sulfur and nitrogen, and where the mole ratio of sulfur or nitrogen to the platinum in the catalyst is low, results in a thermoplastic elastomer product which is much more effectively crosslinked by hydrosilylation. This effect is seen even at extremely low concentrations of catalyst.

EXAMPLE 3

The following Table III illustrates the benefit of prediluting the hydrosilylation crosslinker in oil.

TABLE III

Effect of Diluting Hydrosilylation Crosslinking Agent

| Composition | 1 Cntrl | 2 Cntrl | 3 | 4 | 5 | 6 |
|---|---|---|---|---|---|---|
| TPV masterbatch (g)* | 290 | 290 | 290 | 290 | 290 | 290 |
| Oil added with crosslinker phr | — | — | 1 | 3 | 3 | 9 |
| Crosslinker phr | 3 | 3 | 3 | 3 | 3 | 3 |
| Pt catalyst (ppm**) | 6.2 | 6.6 | 7.5 | 6.2 | 6.2 | 6.9 |
| Oil added to master batch phr | 30 | 30 | 29 | 27 | 27 | 21 |
| Physical Properties | | | | | | |
| Shore A | 55 | 54 | 54 | 55 | 54 | 55 |
| TS % | 8.5 | 8.5 | 8.0 | 6.0 | 6.0 | 7.0 |
| UTS (psi) | 805 | 770 | 680 | 902 | 800 | 680 |
| M100 (psi) | 325 | 310 | 320 | 392 | 350 | 380 |
| M300 (psi) | 669 | 620 | 620 | 792 | 720 | — |
| UE % | 444 | 460 | 360 | 378 | 360 | 260 |
| OS % | 172 | 161 | 159 | 123 | 117 | 119 |
| Gel % | 91.6 | 89.3 | 93.5 | 97.6 | 96.6 | 96.0 |

*(100 parts of rubber) 290 g the TPV masterbatch is equivalent to 100 g of rubber.
**ppm of Pt catalyst is mg of Pt metal/kg of rubber.

The TPV masterbatch included measured by weight 100 parts EPDM, 41 parts polypropylene A, 100 parts oil, 42 parts clay, 2 parts ZnO, and 5 parts wax. A 53.4 g portion of this masterbatch was processed in a Brabender mixer using the recipes in Table III.

The EPDM included about 3–3.5 wt % repeating units from ethylidene norbornene and about 0.25 wt % repeating units from vinylidene norbornene.

The examples 1–6 illustrate that simple addition of concentrated hydrosilylation crosslinker results in about 90% gel while predilution in oil results in about 96% gel and desirable changes in other properties. Compositions where the hydrosilylation crosslinker was added in a 50% or 25% active solution in oil had higher gel content than a composition where it was added as a 75% active solution.

EXAMPLE 4

Table IV below gives the results of oscillating disc rheometer results on hydrosilylation crosslinking of a blend of rubber L and oil with hydrosilylating agents (silicone hydride) of different degrees of polymerization (DP). The rubber is present as 100 parts by weight and the oil is present at 100 parts by weight. The compositions include 2 phr silicon hydride and 0.75 ppm of platinum as catalyst from United Chemical Technology near Philadelphia expressed as platinum metal per total rubber. The results in this example are associated only with the rubber phase as a plastic phase is not present. Compositions prepared using the lower molecular weight silicone hydrides (DP6 and DP8) show more rapid crosslinking and higher crosslink densities as indicated by shorter TS1 times and larger torque rises as compared to the higher molecular weight silicone hydrides (DP42 and DP54). The compositions for this example were prepared by mixing the rubber and additives in a Brabender mixer at a temperature not exceeding 70 C. to prevent premature crosslinking. The oscillating disc rheometer was operated at 200 C.

TABLE IV

The effect of silicone hydride degree of polymerization on reaction kinetics and total torque rise.

| DP of silicone hydride | TS1 (minutes) | TS2 (minutes) | Torque Rise (dN/M) |
|---|---|---|---|
| 6 | 0.85 | 3.27 | 2.55 |
| 8 | 0.86 | 3.53 | 2.53 |
| 42 | 2.21 | — | 1.79 |
| 54 | 3.18 | — | 1.87 |

EXAMPLE 5

Figure 1:
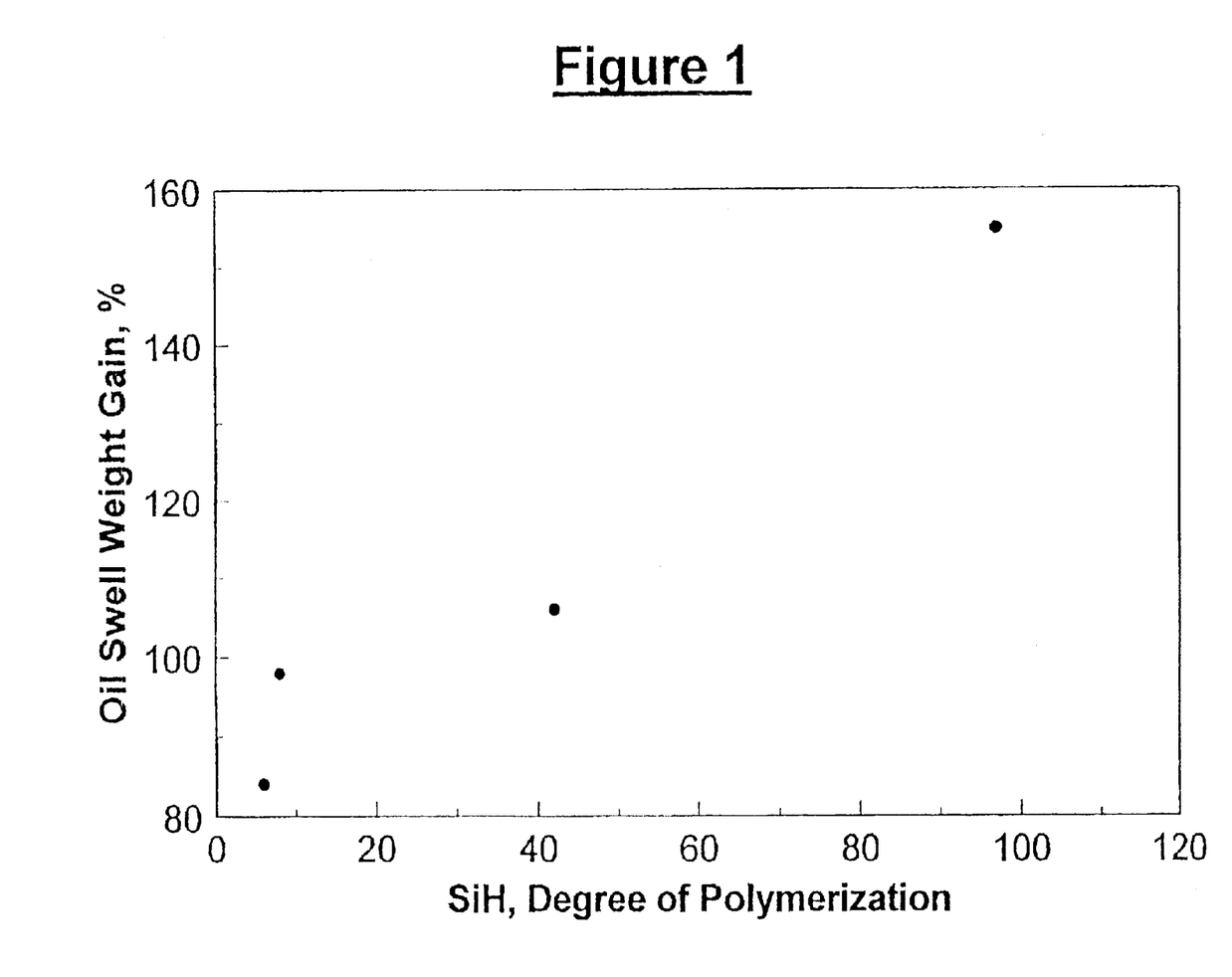
FIG. 1 is a plot of the oil swell value of a TPV versus the degree of polymerization of the silicone hydride.

Thermoplastic vulcanizates were prepared from 100 parts EPDM rubber L, 41 parts of polypropylene, 100 parts of oil, 42 parts of clay, and 0.75 ppm of platinum catalyst (expressed as parts by weight platinum metal per a million parts by weight of rubber), wherein all parts are by weight. The amount of hydrosilylation crosslinking agent was an amount that contained the same number of equivalents of silicon hydride bonds as the DP42 crosslinker present at 2 parts by weight per 100 parts by weight rubber. These results in Table V indicate that the compositions resulting from the use of DP6 and 8 silicon hydrides have lower weight gain in the Oil Swell Test and also lower compression set. Both of these tests indicate a generally higher level of crosslinking with equivalent amounts of reactive Si—H bonds from the DP6 and 8 silicon hydride materials as compared to that achieved with DP42 and 97 silicon hydride materials. The oil swell values versus degree of polymerization of the silicon hydride are also shown in FIG. 1.

TABLE V

| Degree of polymerization of silicon hydride | Shore A Hardness | UTS (psi) | M100 (psi) | UE % | Oil Swell Weight Gain % | Compression Set |
|---|---|---|---|---|---|---|
| 6  | 58 | 792 | 497 | 188 | 84  | 17 |
| 8  | 61 | 934 | 465 | 267 | 98  | — |
| 42 | 60 | 808 | 448 | 257 | 106 | 26 |
| 97 | 57 | 700 | 401 | 343 | 155 | 37 |

EXAMPLE 6

Thermoplastic vulcanizates were prepared from 100 parts of EPDM rubber L, 50 parts of polypropylene A, 168 parts of oil, 42 parts of clay, and 0.9 ppm of platinum catalyst. The parts are parts by weight. The amount and type of hydrosilylation agent varied as shown in Table VI.

While the physical properties (Shore A, M100, UE, UTS and TS did not vary much in Table VI, the oil swell weight gain, ESR, and ACR improved with lower degrees of polymerization (DP) in the hydrosilylation crosslinker. ESR is an extrusion surface rating test ASME D 46.1 where lower values indicate a smoother surface. ACR is similar to ASTM D 3835-96 and stands for automatic capillary rheometer. A lower ACR value indicates that a shorter time is required to extrude a specified amount of TPV through a specified orifice diameter. Lower ESR and ACR values for any formulation are desirable. Historically, as one more tightly crosslinked the rubber phase of a TPV, the ESR and ACR properties worsened dramatically (values increased). As seen in Table VI when the amount of DP8 or DP42 crosslinker is increased the ESR and ACR values worsen (increase). A comparison between compositions prepared with DP8 crosslinkers and DP42 crosslinkers reveals that the oil swell values are lower for compositions prepared from DP8 crosslinkers. Lower oil swell values in the DP8 crosslinked samples indicate higher crosslink density in the rubber phase of the TPV. Consequently, one would expect higher ACR and ESR values in DP8 crosslinked samples. Quite unexpectedly this was not observed. In fact, the ACR and ESR values of the DP8 (2 phr) crosslinked sample were about 30% lower than those of the DP42 (2 phr) crosslinked sample even though the DP8 crosslinked sample had lower oil swell (higher crosslink density).

TABLE VI

|  | DP 42 2.0 phr | DP 42 1.5 phr | DP 42 1.0 phr | DP 8 2.0 phr | DP 8 1.5 phr | DP8 1.0 phr |
|---|---|---|---|---|---|---|
| Shore A | 66 | 69 | 70 | 67 | 68 | 70 |
| M100 (psi) | 346 | 378 | 354 | 381 | 345 | 331 |
| UE % | 593 | 505 | 534 | 540 | 516 | 561 |
| UTS (psi) | 782 | 741 | 644 | 835 | 713 | 649 |
| TS % | 13 | 13 | 15 | 10.5 | 13 | 15 |
| Oil Swell % | 128 | 134 | 152 | 111 | 133 | 138 |
| ESR | 88 | 66 | 53 | 61 | 39 | 32 |
| ACR | 113 | 105 | 71 | 80 | 76 | 59 |

EXAMPLE 7

This example is a high rubber content TPV comprising 100 parts EPDM rubber L with 5 vinyl-2-norbornene as the diene, 30 parts polypropylene A, 115 parts oil, 10 parts clay, 0.89 ppm of platinum in the form of a platinum catalyst and either 2, 2.5 or 3 phr of a DP42 or DP8 hydrosilylation crosslinker. The physical properties reflect that the DP8 hydrosilylation crosslinker is more efficient on a weight basis than the DP42 material. The Shore A value is generally higher, the M100 is higher, the UE is lower the tension set is the same or lower, and the compression set is lower. More dramatic improvements are seen in the ESR and ACR. The improvement in ESR indicates that more elastic compounds may be prepared using DP8 crosslinkers without sacrificing surface smoothness. The improvement in ACR indicates that compositions crosslinked with DP8 extrude faster with an equivalent amount of rubber.

TABLE VII

|  | DP42 2 phr | DP8 2 phr | DP8 2.5 phr | DP8 3 phr |
|---|---|---|---|---|
| Shore A | 58 | 60 | 59 | 58 |
| M100 (psi) | 259 | 280 | 276 | 277 |
| UE % | 462 | 426 | 398 | 418 |
| UTS (psi) | 814 | 814 | 773 | 839 |
| TS % | 10 | 10 | 10 | 8.75 |
| CompSet % | 26.6 | 23 | 25 | 25.2 |
| ESR | 113 | 54 | 67 | 67 |
| ACR | 490 | 392 | 462 | 457 |

EXAMPLE 8

Copolymers of isobutylene and divinylbenzene (Butyl Rubber M & N) were crosslinked with a hydrosilation crosslinking having a degree of polymerization (DP) of 6 in Table VIII. A control (7) using a hydrosilation crosslinking agent of DP 42 was included for comparison purposes.

A comparison of compositions 8–11 to composition 7 illustrates that the DP 6 hydrosilation crosslinking agent of compositions 8–11 is much more effective than the DP-42 hydrosilation crosslinking agent of composition 7. Further the amount of hydrosilation crosslinking agent and hydrosilation catalyst was gradually reduced in compositions 9, 10 and 11 by a factor of two thirds and one half respectively. Composition 12 varied in physical properties because the relative amount of polypropylene was increased, resulting in a harder, less elastic composition. Composition 13 varied in physical properties due to the substitution of butyl rubber N for butyl rubber M. Butyl rubber M is Butyl XL 10,000 rubber from Polysar and butyl rubber N is Butyl XL 30,102 rubber from Polysar. The catalyst is PC-085 from Dow-Corning diluted to 1 weight percent active in paraffin oil. The polybutene oil is Parapol 450 from Exxon.

TABLE VIII

| Composition | 7 | 8 | 9 | 10 | 11 | 12 | 13 |
|---|---|---|---|---|---|---|---|
| ORGANOSILOXANE CURED BUTYL TPV | | | | | | | |
| Butyl rubber M | 50.00g | 50.00 | 50.25 | 50.51 | 50.76 | 34.01 | |
| Butyl rubber N | | | | | | | 50.25 |
| Polypropylene B | 22.50 | 22.50 | 22.61 | 22.73 | 22.84 | 30.61 | 22.61 |
| Si—H DP = 42 | 1.50 | | | | | | |
| Si—H DP = 6 | | 1.50 | 1.01 | 1.01 | 0.51 | 0.68 | 1.01 |
| Catalyst | 1.00 | 1.00 | 1.01 | 0.51 | 0.51 | 0.68 | 1.01 |
| (Polybutene) Oil | 25.00 | 25.00 | 25.13 | 25.25 | 25.38 | 34.01 | 25.13 |
| Total | 100.00 | 100.00 | 100.00 | 100.00 | 100.00 | 100.0 | 100.00 |
| PHYSICAL PROPERTIES | | | | | | | |
| Hardness A, 5 sec | 67 | 74 | 74 | 73 | 68 | 87 | 74 |
| UE % | 271 | 322 | 252 | 327 | 313 | 249 | 283 |
| UTS, psi | 519 | 1099 | 887 | 1026 | 668 | 1172 | 496 |
| M-100, psi | 342 | 484 | 486 | 451 | 358 | 830 | 415 |
| Tear Strength, pli | 100 | 133 | 116 | 112 | 103 | 184 | 129 |
| Tension Set, % | 20 | 13 | 13 | 15 | 15 | 25 | 36 |
| Comp. Set, 22 hrs, 70° C. | 39 | 27 | 28 | 29 | 32 | 43 | 70 |

While the best mode and preferred embodiment of the invention have been set forth in accord with the Patent Statutes, the scope of the invention is not limited thereto, but rather is defined by the attached claims.

What is claimed is:

1. A thermoplastic vulcanizate comprising,
   a) a thermoplastic resin blended with a crosslinked rubber,
   b) optionally fillers, extender oils, and plasticizers,
   c) wherein said crosslinked rubber comprises crosslinks which are the reaction product of a hydrosilylation crosslinking agent having a degree of polymerization of about 2 to about 20 reacted with residual unsaturated carbon to carbon double bonds in said rubber in the presence of a hydrosilylation catalyst, and wherein the crosslinking agent has been introduced into said vulcanizate in the form of an about 20 to about 80 weight percent solution of said agent in oil.

2. A thermoplastic vulcanizate according to claim 1, wherein said rubber comprises an EPDM rubber.

3. A thermoplastic vulcanizate according to claim 1, wherein said hydrosilylation crosslinking agent has a degree of polymerization from about 3 to about 15.

4. A thermoplastic vulcanizate according to claim 1, wherein said rubber has residual carbon to carbon double bonds which are sterically unhindered.

5. A thermoplastic vulcanizate according to claim 1, wherein said rubber comprises a copolymer containing at least repeating units from isobutylene and an aromatic divinyl compound.

6. A thermoplastic vulcanizate according to claim 1, wherein said rubber comprises an acrylic or alkacrylic functionalized copolymer from copolymerizing isobutylene and para-methylstyrene.

* * * * *